Feb. 2, 1960  W. G. TOLAND ET AL  2,923,362
GROUND WHEEL FOR IMPLEMENT
Filed Aug. 12, 1957  2 Sheets-Sheet 1
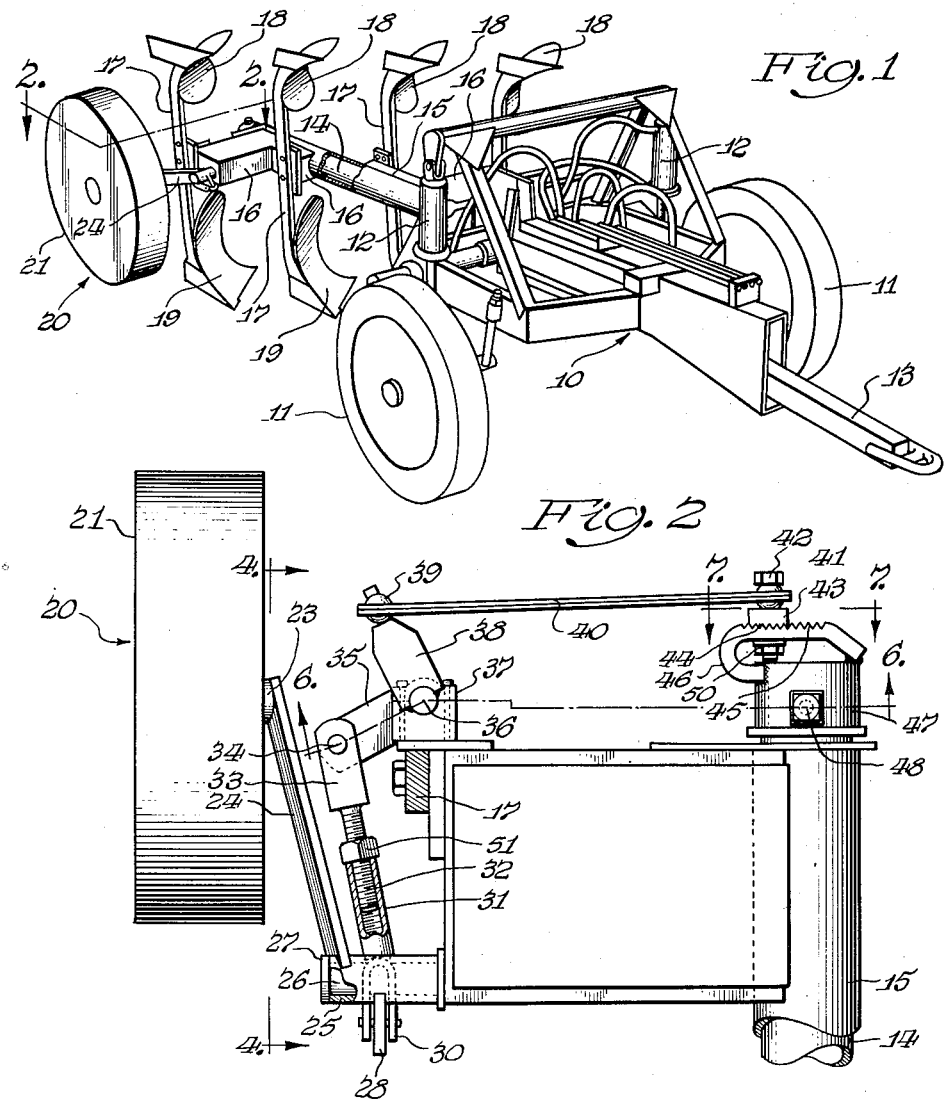
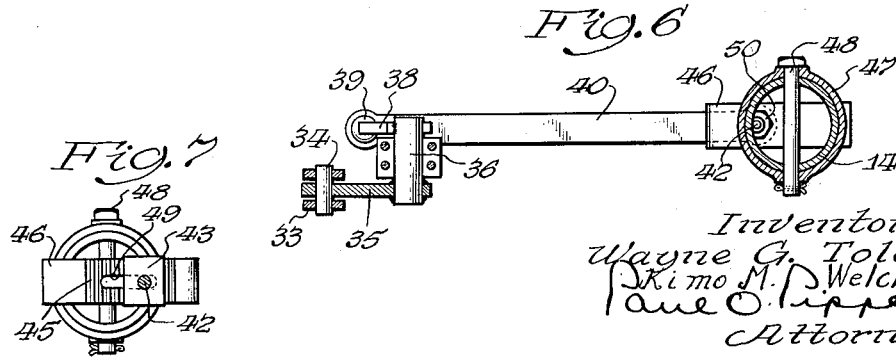
Inventors:
Wayne G. Toland
Kimo M. Welch
Paul O. Pippel
Attorney

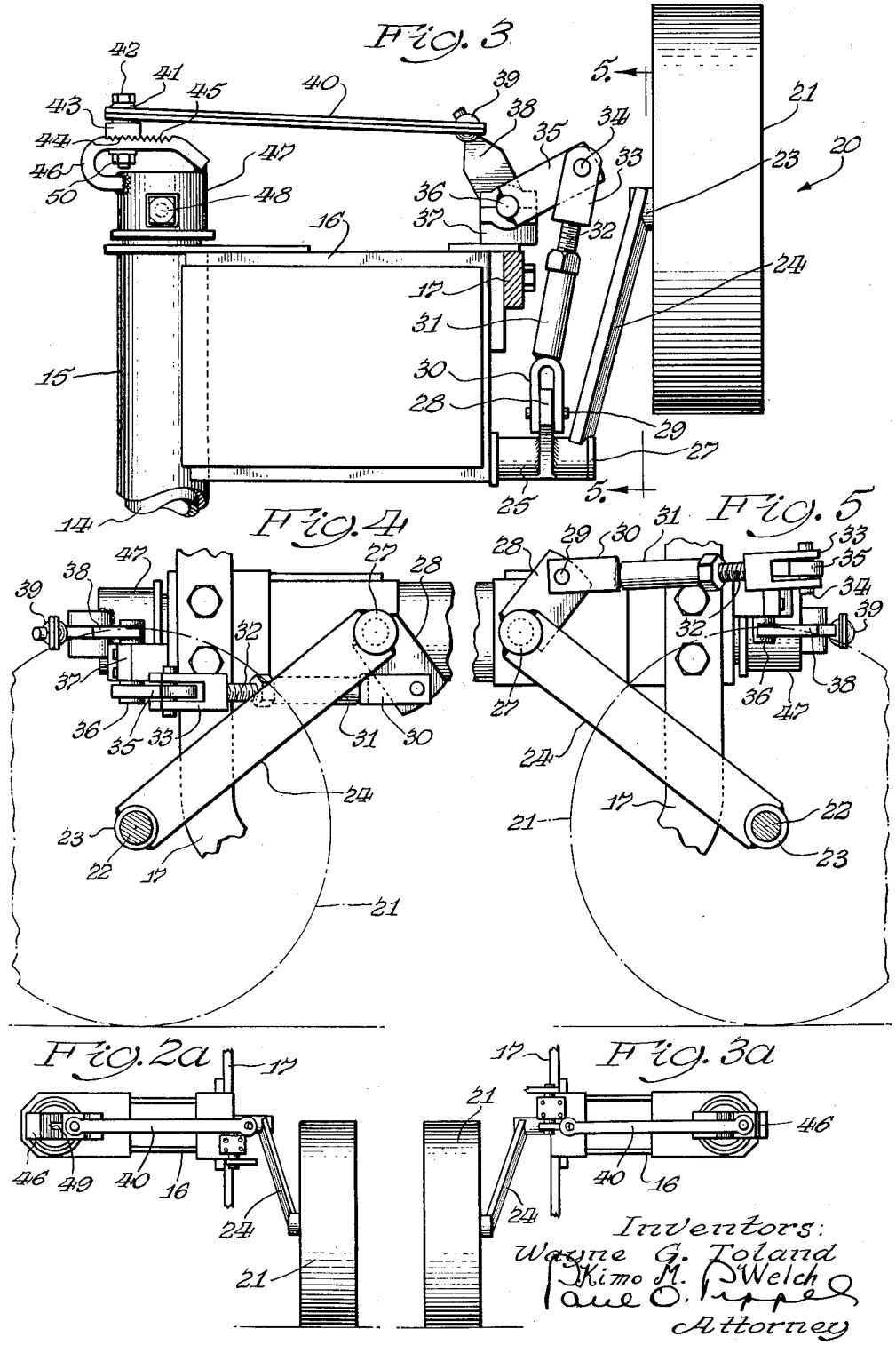

United States Patent Office 2,923,362
Patented Feb. 2, 1960

2,923,362

GROUND WHEEL FOR IMPLEMENT

Wayne G. Toland, Stockton, and Kimo M. Welch, Palo Alto, Calif., assignors to International Harvester Company, Chicago, Ill., a corporation of New Jersey Application August 12, 1957, Serial No. 677,554

9 Claims. (Cl. 172—212)

This invention relates to a two-way plow of the roll-over type and particularly to depth gauging means therefor. The invention is specifically concerned with the type of two-way plow wherein alternately operating right and left-hand plow bottoms are mounted on a revolving carrier which is carried on a supporting frame for rotation about a generally horizontal axis extending in the direction of travel. It is not unusual in plows of this type, particularly in the more massive, multi-bottom implements, to reduce cost and weight by utilizing a single gauge wheel and mounting it on the tool carrier for bodily rotation therewith and lateral shifting to opposite sides of the carrier to function as the gauging means for both right and left-hand bottoms.

An object of the invention is to provide a novel gauge wheel unit for a two-way plow of the character referred to wherein the load applied to the gauge wheel by the plow frame in the gauging operation is transmitted directly to the main supporting frame of the plow.

Another object of the invention is to provide a novel gauge-wheel mounting and depth-adjusting means for a two-way plow, wherein the same gauge wheel functions as the gauging means for the alternately operating right and left-hand bottoms in both operating positions of the plow and wherein provision is made for effecting adjustments in the operating depth of the plow units.

Another object of the invention is to provide a novel gauge wheel mounting for a roll-over two-way plow of the character referred to, wherein the weight of the plow on the gauge wheel during operation is transmitted from the wheel to the plow frame through a transversely extending thrust link or rod pivotally connected to the frame for swinging with the tool-carrier about a pivot axis eccentric to the axis of rotation of the carrier.

Other objects and advantages of the invention will become clear from the following detailed description when read in conjunction with the accompanying drawing, wherein:

Figure 1 is a view in perspective of a two-way roll-over plow of the type with which this invention is associated adapted to be connected in trailing relation to a tractor to be propelled thereby, and showing a gauge wheel assembly embodying the features of this invention incorporated therein;

Figure 2 is an enlarged sectional plan view of a portion of the plow shown in Figure 1 viewed on the line 2—2 thereof;

Figure 2-A is an end elevation on a smaller scale showing the structure of Figure 2;

Figure 3 is an enlarged plan view similar to Figure 2 but showing the reversed position of the gauge wheel unit;

Figure 3-A is an end elevation on a smaller scale showing the structure illustrated in Figure 3;

Figure 4 is a section taken on the line 4—4 of Figure 2;

Figure 5 is a section taken on the line 5—5 of Figure 3;

Figure 6 is a section taken on the line 6—6 of Figure 2, and

Figure 7 is a section taken on the line 7—7 of Figure 2.

The invention is described herein in its application to a roll-over two-way plow such as that illustrated in Figure 1. The gauge wheel unit of the invention is mounted upon the rear end of the plow, and since most of the constructional details of the plow form no part of this invention, and such construction is well known, only the essential structure will be described in detail. Briefly, however, it should be noted that the two-way plow shown in Figure 1 comprises a main supporting frame 10 mounted for vertical movement between operating and transport positions upon laterally spaced ground wheels 11, raising and lowering of the implement frame being accomplished by conventional power operated means such as hydraulic rams 12. Connection to the propelling vehicle is made by means of a draft tongue 13 projecting forwardly from the mobile supporting frame 10.

Forming a part of the main frame 10 and extending longitudinally rearwardly therefrom is a tubular supporting beam 14 upon which is rotatably mounted a tubular plow carrier 15 having secured thereto a plurality of plow supports 16. Upright plow standards 17 are affixed to the supports 16 and upon opposite ends thereof are mounted alternately operating right and left-hand plow bottoms 18 and 19, respectively.

In Figure 1 the left-hand plow units 19 are shown in operating position. In order to place the right-hand plow bottoms 18 in operation, the tubular carrier 15 is rotated about the axis of the longitudinally extending beam 14, and by any suitable well known means reacting between the main frame 10 and the carrier 15, and forming no part of this invention. Such reversing means is conventional and well known and upon actuation thereof the tool carrier 15 is revolved 180° from the position shown in Figure 1, and the gauge wheel assembly of this invention, indicated generally by the numeral 20, is bodily swung therewith to a position on the opposite side of the axis of beam 14.

The gauge wheel assembly 20 includes a ground-engaging wheel 21 having a stub axle 22 rotatable in a bearing 23 to which is affixed the downwardly extending rear end of a crank arm 24, the forward upwardly extending end of which is secured to a bearing member 25 in which is rotatably received a stub shaft 26 affixed to and projecting laterally from the rearmost plow supporting member 16, the bearing 25 being held against axial displacement therefrom by a cap 27. The sleeve or bearing member 25 and arm 24 constitute a crank axle vertically swingable about the axis of the shaft 26 with respect to the plow carrier 15 and the beam 14.

In operation of the plow the weight of the frame and plow carrier presses downwardly upon the wheel 21, and the latter is held in a selected adjusted position relative to the plow frame and carrier, in order to gauge the operating depth of the plow bottoms, by means which includes an arm affixed to and projecting downwardly from the bearing member 25. Arm 28 is pivotally connected by a pin 29 to a clevis 30 affixed to one end of a threaded sleeve 31 in which is received a threaded bolt 32 having at its outer end a clevis 33.

Clevis 33 is pivotally connected by a pin 34 to an arm 35 mounted on a rockshaft 36 rotatable in a bearing block 37 affixed to the rearmost support 16.

Another arm 38, affixed to rockshaft 36 is pivotally connected by a universal joint 39 to one end of a transversely extending thrust link or rod 40, the other end of which is connected by a universal joint 41 to a bolt 42 upon which is mounted a block 43.

Serrations 44 on the forward face of block 43 engage complementary serrations 45 in an adjusting bracket 46, affixed, as by welding, to a thrust collar 47 secured to the rear end of supporting beam 14 of the main frame by a pin 48 extending through suitable registering openings in the collar 47 and beam 14. In addition to preventing axial displacement of the tool carrier 15 from beam 14, collar 47 also serves for the attachment thereto of serrated bracket 46, the serrations 45 of which are offset laterally to one side of the axis of rotation of carrier 15.

Bolt 42 is slidably receivable in an elongated transversely extending slot 49 in bracket 46 and is held in a selected lateral position with respect thereto by means of the serrations 44 and 45 and a nut 50 threaded on the end of the bolt.

The vertical position of gauge wheel 21 with respect to the plow frame and particularly plow carrier 15, determines the depth of operation of the operating plow bottoms. Gauge wheel 21 is capable of vertical adjustment about the axis of shaft 26, and when in operation, the weight of the plow frame is transmitted through the gauge wheel, arm 28, rockshaft 36 and thrust link 40, to the longitudinal beam 14 through the connection of link 40 to bracket 46 on thrust collar 47. Adjustment in the vertical position of the gauge wheel with respect to the operating plow bottoms is made by loosening nut 50 and adjusting block 43 with respect to bracket 46 by sliding bolt 42 in the slot 49.

It will be observed that bolt 42 is the pivot axis of link 40 as it swings with the gauge wheel assembly 20 and tool carrier 15 about the axis of the beam 14. It will also be observed that the bolt 42 is eccentrically disposed with respect to the axis of rotation of the carrier 15. Thus, the pivot axis of link 40 remains the same in the operating position of Figure 2, as in the reverse operating position shown in Figure 3. Shaft 36 is rocked about its axis so that wheel 21 is again lowered to an operating position corresponding to that of Figure 2, rocking of the shaft 36 being transmitted to the linkage 35, 33, 31 and 28 to swing the gauge wheel downwardly to operating position. Thus the position of wheel 21 during the revolving of tool carrier 15 is controlled at all times.

Independent adjustment of the gauge wheel 21 in either operating position is made by adjusting the position of bolt 32 in sleeve 31 to shorten or lengthen the spacing between arms 28 and 35, sleeve 31 having a nut 51 welded to its end.

The operation of the gauging means of this invention should be clearly understood from the foregoing description. It should likewise be understood that the invention has been described only in its preferred embodiment and that modifications may be made therein without departing from the spirit thereof or the scope of the appended claims.

What is claimed is:

1. In a two-way plow of the type wherein a tool-carrying frame having right and left-hand plow units thereon is mounted on a relatively stationary frame for rotation about a longitudinal axis to dispose said plow units alternately in operation, depth gauging means carried by the tool-carrying frame and rotatable therewith to serve as the gauging means for each of said plow units, comprising a wheel, a rockable member mounted on the tool-carrying frame operatively connected to said wheel for swinging the latter in a vertical plane relative to said tool-carrying frame upon rotation thereof, and means pivotally connecting said rockable member to said stationary frame and reactable against the latter during rotation of the tool-carrying frame to shift the wheel bodily relative thereto.

2. In a two-way plow of the type wherein a tool-carrying frame having right and left-hand plow units thereon is mounted on a relatively stationary frame for rotation about a longitudinal axis to dispose said plow units alternately in operation, depth gauging means carried by the tool-carrying frame and rotatable therewith to serve as the gauging means for each of said plow units, comprising a ground wheel assembly mounted on the tool-carrying frame for bodily swinging relative thereto and rotatable therewith to alternate operating positions with respect to said plow units, and a thrust link pivotally connected to said stationary frame, said thrust link being operatively connected to said wheel assembly and reactable against said stationary frame during rotation of the tool-carrying frame to swing said wheel assembly bodily relative to the tool-carrying frame.

3. In a two-way plow of the type wherein a tool-carrying frame having right and left-hand plow units thereon is mounted on a relatively stationary frame for rotation about a longitudinal axis to dispose said plow units alternately in operation, depth gauging means carried by the tool-carrying frame and rotatable therewith to serve as the gauging means for each of said plow units, comprising a wheel, a rockable member mounted on the tool-carrying frame operatively connected to said wheel for swinging the latter in a vertical plane relative to said tool-carrying frame upon rotation thereof and a thrust link pivotally connected to said rockable member and to said stationary frame on an axis eccentric to the axis of rotation of said tool-carrying frame and swingable with the latter from one of its operating positions to the other.

4. The invention set forth in claim 3 wherein means are provided for adjusting the eccentricity of the pivot axis of said link on the stationary frame relative to the axis of the tool carrier.

5. In a two-way plow of the type wherein a tool-carrying frame having right and left-hand plow units thereon is mounted on a relatively stationary frame for rotation about a longitudinal axis to dispose said plow units alternately in operation, depth gauging means carried by the tool-carrying frame and rotatable therewith to serve as the gauging means for each of said plow units, comprising a wheel, a rockable member mounted on the tool-carrying frame operatively connected to said wheel for swinging the latter in a vertical plane relative to said tool-carrying frame upon rotation thereof, a thrust link pivotally connected at one end to said rockable member, means pivotally connecting the other end of said link to the stationary frame on an axis spaced laterally from the axis of rotation of the tool-carrier, whereby said link is swingable laterally about its axis on the stationary frame while the gauge means is swung laterally about the axis of the tool-carrier, the means pivotally connecting said other end of the link to the stationary frame including means accommodating adjustment of the spacing between the pivot axis of the link on the stationary frame and the axis of the tool-carrier.

6. In a two-way plow of the type wherein a tool-carrying frame having right and left-hand plow units thereon is mounted on a relatively stationary frame for rotation about a longitudinal axis to dispose said plow units alternately in operation, a gauge wheel assembly carried by the tool-carrying frame at one side of the axis of rotation thereof and bodily rotatable with said tool frame to the opposite side of said axis to alternately gauge the operating depth of the plow units, comprising a laterally extending link pivotally connected at one end to the stationary frame on an axis laterally spaced from the axis of the tool-carrying frame, said link being bodily swingable about its axis upon rotation of the tool-carrying frame, and means operatively connecting the other end of said link to said gauge wheel assembly to transmit directly thereto the rotation of the tool-carrying frame, said rotation being transmitted to the gauge wheel assembly to shift the latter relative to the tool-carrying frame and hold it in a selected position relative to the tool-carrying frame.

7. In a two-way plow of the type wherein a tool-carrying frame having right and left-hand plow units thereon is mounted on a relatively stationary frame for rotation about a longitudinal axis to dispose said plow units alternately in operation, a gauge wheel assembly carried by the tool-carrying frame at one side of the axis of rotation thereof and bodily rotatable with said tool frame to the opposite side of said axis to alternately gauge the operating depth of the plow units, said gauge wheel being vertically movable relative to the tool-carrying frame, and means for vertically moving said gauge wheel and holding it in a selected vertical position relative to the tool-carrying frame, comprising a rockable member mounted on the tool-carrying frame operatively connected to said gauge wheel for vertically moving the latter upon rocking the rockable member, and a laterally extending thrust link pivotally connected at one end to the rockable member and at its other end to said stationary frame on an axis eccentric to the axis thereof for transmitting the rotation of the tool frame to said gauge wheel assembly upon rotation of the latter about the axis of the tool frame.

8. The invention set forth in claim 7, wherein the pivotal connection of said thrust link to the stationary frame is adjustable to vary the distance therebetween and the axis of the tool-carrying frame.

9. In a two-way plow of the type wherein a tool-carrying frame having right and left-hand plow units thereon is mounted on a relatively stationary frame for rotation about a longitudinal axis to dispose said plow units alternately in operation, depth gauging means carried by the tool-carrying frame and rotatable therewith to serve as the gauging means for each of said plow units including a ground engaging wheel, a crank axle pivoted on the frame and supporting said wheel for vertical swinging, and means converting said vertical swinging into lateral thrust reacting against the stationary frame to hold said wheel in a selected gauging position comprising a rockable member mounted on the tool-carrying frame for vertically swinging said wheel upon rocking of said member, a thrust rod connecting said rockable member to said stationary frame at a location laterally spaced from the axis of the tool-carrying frame to hold the wheel in its gauging position and means for varying the gauging position of said wheel relative to the tool-carrying frame comprising means for lateraly adjusting the connection of said thrust rod to the stationary frame.

References Cited in the file of this patent

UNITED STATES PATENTS

| 2,760,420 | Pursche | Aug. 28, 1956 |
| 2,777,373 | Pursche | Jan. 15, 1957 |

FOREIGN PATENTS

| 21,018 | Australia | of 1929 |